(12) United States Patent
Ikeda et al.

(10) Patent No.: US 8,633,811 B2
(45) Date of Patent: Jan. 21, 2014

(54) DRIVING ASSIST APPARATUS

(75) Inventors: Keigo Ikeda, Toyota (JP); Noboru Nagamine, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 340 days.

(21) Appl. No.: 12/729,594

(22) Filed: Mar. 23, 2010

(65) Prior Publication Data

US 2010/0289634 A1    Nov. 18, 2010

(30) Foreign Application Priority Data

May 18, 2009    (JP) ................................. 2009-120014

(51) Int. Cl.
*B60Q 1/00*    (2006.01)
*G06G 7/78*    (2006.01)

(52) U.S. Cl.
USPC .......................................... 340/441; 701/301

(58) Field of Classification Search
USPC .......... 340/438, 441, 436, 461; 701/211, 300, 701/301, 1; 345/629
See application file for complete search history.

(56) References Cited

U.S. PATENT DOCUMENTS

| | | | |
|---|---|---|---|
| 5,587,699 A | 12/1996 | Faloon et al. | |
| 6,704,653 B2 | 3/2004 | Kuriya et al. | |
| 7,256,688 B2 * | 8/2007 | Mizusawa | 340/461 |
| 7,457,705 B2 * | 11/2008 | Takahashi et al. | 701/454 |
| 7,505,047 B2 * | 3/2009 | Yoshimura | 345/620 |
| 7,519,471 B2 * | 4/2009 | Shibata et al. | 701/523 |
| 7,554,573 B2 * | 6/2009 | Mizusawa | 348/115 |
| 7,558,672 B2 * | 7/2009 | Egami et al. | 701/301 |
| 7,627,419 B2 * | 12/2009 | Yoshida | 701/117 |
| 7,664,598 B2 * | 2/2010 | Yamamoto et al. | 701/438 |
| 7,733,244 B2 * | 6/2010 | Asada | 340/995.1 |
| 7,991,528 B2 * | 8/2011 | Pu | 701/36 |

(Continued)

FOREIGN PATENT DOCUMENTS

| | | |
|---|---|---|
| EP | 1 249 365 A1 | 10/2002 |
| EP | 1 717 757 A1 | 11/2006 |

(Continued)

OTHER PUBLICATIONS

Communication dated Feb. 14, 2012, issued by the European Patent Office in corresponding European Patent Application No. 10157478.8.

(Continued)

*Primary Examiner* — Benjamin C Lee
*Assistant Examiner* — Sigmund Tang
(74) *Attorney, Agent, or Firm* — Sughrue Mion, PLLC

(57) ABSTRACT

A driving assist apparatus includes: an image obtaining unit that obtains a peripheral image of a vehicle, which is captured by an image capturing device provided in the vehicle; a display device that is provided in the interior of the vehicle and displays the peripheral image; a display object generation unit that generates a display object including an index line serving as an index for assisting a driver who drives the vehicle; a vehicle state detection unit that detects at least one of behavior of the vehicle and a state of a driving operation; a display type determining unit that determines a transparent display type of the display object based on the detection result of the vehicle state detection unit; and a display control unit that superimposes and displays the display object on the peripheral image, which is displayed on the display device, based on the determined transparent display type.

8 Claims, 10 Drawing Sheets

(56) References Cited

U.S. PATENT DOCUMENTS

| | | | |
|---|---|---|---|
| 2002/0128754 A1* | 9/2002 | Sakiyama et al. | 701/1 |
| 2002/0145662 A1 | 10/2002 | Mizusawa et al. | |
| 2005/0071082 A1* | 3/2005 | Ohmura et al. | 701/211 |
| 2005/0203704 A1 | 9/2005 | Frank et al. | |
| 2006/0271278 A1 | 11/2006 | Sakakibara et al. | |
| 2008/0100614 A1 | 5/2008 | Augst | |
| 2010/0228426 A1* | 9/2010 | Suzuki et al. | 701/29 |
| 2010/0265048 A1 | 10/2010 | Lu et al. | |
| 2011/0069169 A1 | 3/2011 | Kadowaki et al. | |
| 2011/0181724 A1 | 7/2011 | Kadowaki et al. | |
| 2011/0298927 A1* | 12/2011 | Taylor et al. | 348/148 |

FOREIGN PATENT DOCUMENTS

| | | |
|---|---|---|
| JP | 2000-177512 A | 6/2000 |
| JP | 3374833 B2 | 11/2002 |
| JP | 2006-284458 A | 10/2006 |
| JP | 2006-327433 A | 12/2006 |
| JP | 2007-158426 A | 6/2007 |
| WO | 96/14222 A1 | 5/1996 |
| WO | 2009/036176 A1 | 3/2009 |
| WO | 2009-136559 A1 | 11/2009 |

OTHER PUBLICATIONS

Communication dated Oct. 8, 2012, issued by the European Patent Office in corresponding European Patent Application No. 10157478.8.

Office Action dated Jun. 20, 2013 issued by the Japanese Patent Office in corresponding Japanese Patent Application No. 2009-120014.

Communication from the Japanese Patent Office dated Mar. 28, 2013, in a counterpart application No. 2009-120014.

* cited by examiner

DRIVING ASSIST APPARATUS

CROSS REFERENCE TO RELATED APPLICATION

The present application claims priority from Japanese Patent Application No. 2009-120014, which was filed on May 18, 2009, the disclosure of which is incorporated herein by reference in its entirety.

TECHNICAL FIELD

The disclosure relates to a driving assist apparatus for assisting driving of a vehicle.

BACKGROUND DISCUSSION

In the case of driving a vehicle, users frequently park the vehicle in a predetermined parking space. In the case of parking the vehicle, since backward travel is frequently performed, many users feel difficulty in parking the vehicle. Further, regardless of users feeling difficulty in parking the vehicle, since the visibility at the rear of the vehicle is poor as compared with the visibility in front of the vehicle, users feel some stress in backward travel as compared with forward travel. In this regard, there has been used a technique of allowing users to easily park a vehicle in a target parking space when parking the vehicle, or a technique of displaying an expected travel locus of a vehicle as well as the situations at the rear of the vehicle when reversing the vehicle. A technique described in JP3374833B has been proposed as one example of such a technique.

A vehicle-reversing assist apparatus described in JP3374833B has a function of performing a steering assist guide display to allow a driver to understand a steering timing, a steering amount and a distance in which a vehicle travels backward when the driver parks the vehicle. The vehicle-reversing assist apparatus includes a camera for capturing a view of the rear of the vehicle, a turning start recognition means for detecting the start of a turning operation of the vehicle, and a turning angle detection means for detecting a turning angle after the turning operation is started. The vehicle-reversing assist apparatus having such a configuration superimposes and displays a guide display line based on the turning angle on an image (hereinafter, referred to as "camera image") captured by the camera when the vehicle is reversed.

In the vehicle-reversing assist apparatus described in JP3374833B, it is preferred to superimpose and display a guide line (one example of an index line) for allowing a driver to understand the position relationship between an obstacle reflected in the camera image and a vehicle. However, due to the superimposition of the guide line, the visibility of the camera image may be obstructed. When an obstacle or a target position, in which the vehicle is to be parked, is sufficiently spaced apart from the vehicle, it is preferred to enhance the visibility of the whole of the camera image for the jumping out of hurried pedestrians. Further, a case may occur in which the driver does not notice the whole of the camera image by paying attention only to the vicinity of the superimposed guide line.

A need exists for a driving assist apparatus which is not susceptible to the drawback mentioned above.

SUMMARY

In view of the above, it is an object of this disclosure to provide a driving assist apparatus capable of enhancing the visibility in the surroundings of a vehicle without reducing the operation efficiency and visibility of a driver.

In order to achieve the above object, according to an aspect of this disclosure, there is provided a driving assist apparatus comprising:

an image obtaining unit that obtains a peripheral image of a vehicle, which is captured by an image capturing device provided in the vehicle;

a display device that is provided in the interior of the vehicle and displays the peripheral image;

a display object generation unit that generates a display object including an index line serving as an index for assisting a driver who drives the vehicle;

a vehicle state detection unit that detects at least one of behavior of the vehicle and a state of a driving operation;

a display type determining unit that determines a transparent display type of the display object based on the detection result of the vehicle state detection unit; and a display control unit that superimposes and displays the display object on the peripheral image, which is displayed on the display device, based on the determined transparent display type.

With such a configuration, the transparent display type of the display object superimposed and displayed on the peripheral image is determined based on at least one of the behavior of the vehicle and the driving states, so that the display object can be displayed according to the driving states. Consequently, the surroundings of the vehicle can be prevented from being invisible by the display object, so that the visibility in the surroundings of the vehicle can be enhanced. Further, when a driver must pay attention to an obstacle, etc., the transparent display type of the display object is determined according to the driving states, so that the operation efficiency and the visibility of the driver can be prevented from being reduced.

Further, the vehicle state detection unit detects at least the behavior of the vehicle, and the behavior of the vehicle is defined based on the speed or acceleration of the vehicle. Preferably, when the vehicle speed or the acceleration exceeds a setting value set in advance, the display type determining unit determines the transparent display type so as to increase the transmittance of the display object.

With such a configuration, for example, when the speed and/or the acceleration of the vehicle exceed the setting value set in advance, the transmittance of a display object superimposed on the peripheral image is increased and displayed, so that the peripheral image can be prevented from being invisible by the display object. Consequently, even if an obstacle, etc. is located below (at a lower layer of) the display object, it is possible to prevent oversight of the obstacle, etc.

Furthermore, the vehicle state detection unit detects at least the state of the driving operation, and the state of the driving operation is defined based on the steering speed or steering acceleration of a steering. Preferably, when the steering speed or the steering acceleration exceeds a setting value set in advance, the display type determining unit determines the transparent display type so as to increase the transmittance of the display object.

With such a configuration, for example, when the steering speed and/or the steering acceleration of the steering exceed the setting value set in advance, the transmittance of a display object superimposed on the peripheral image is increased and displayed, so that the peripheral image can be prevented from being invisible by the display object. Consequently, even if an obstacle, etc. is located below (at a lower layer of) the display object, it is possible to prevent oversight of the obstacle, etc.

In addition, it is preferred that the index line includes at least one of a side portion and a shadow portion.

With such a configuration, since the index line can be three-dimensionally displayed, the index line is also three-dimensionally displayed with respect to the peripheral image of a vehicle having a three-dimensional depth, so that the position relationship between the peripheral image and the index line can be easily recognized. Further, the index line is three-dimensionally displayed, so that an operator can obviously recognize the position relationship between the peripheral image and the index line. Herein, the index line is three-dimensionally displayed to enhance the visibility. However, the drawn line itself is thickened, so an obstacle, etc. included in the peripheral image may not be visible. In this regard, according to this disclosure as described above, the transparent display type of the index line is determined based on at least one of the behavior of the vehicle and the state of the driving operation, so that the obstacle can be prevented from being invisible. Consequently, the position relationship between the peripheral image and the index line can be easily recognized and the oversight of the obstacle can be prevented.

DETAILED DESCRIPTION

Figure 1:
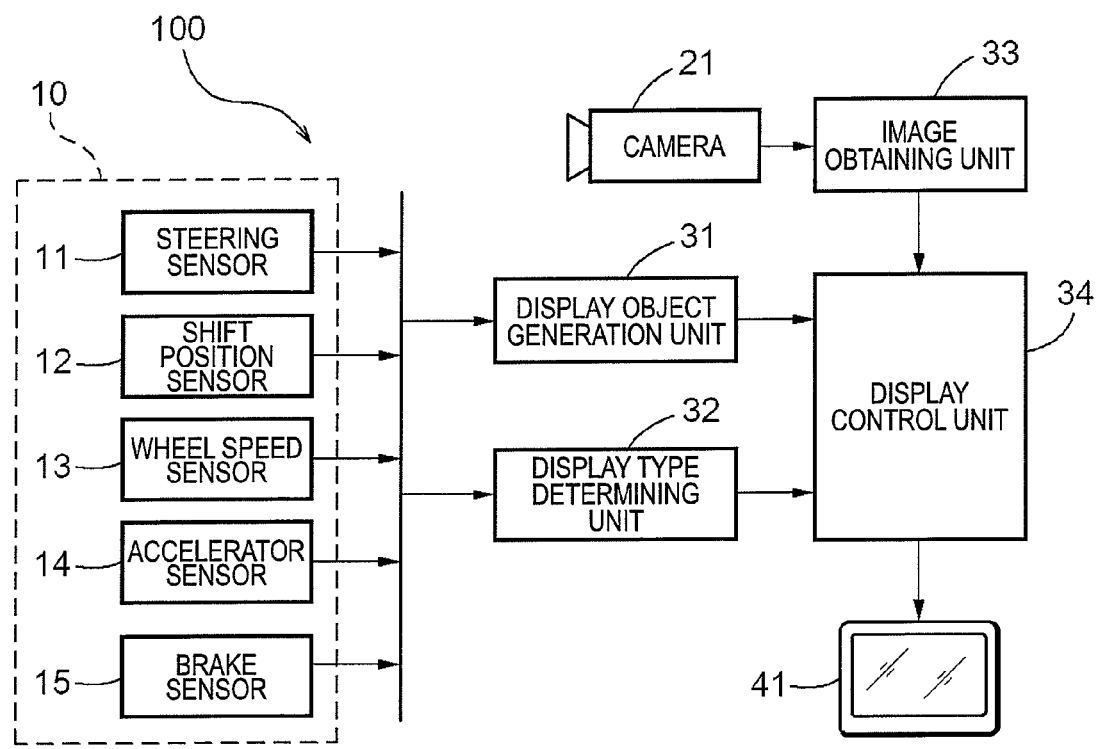
FIG. 1 is a block diagram schematically illustrating the configuration of a driving assist apparatus.

Hereinafter, embodiments disclosed here will be described in detail. A driving assist apparatus 100 according to this disclosure has a function of changing the display type of a display object displayed on a display device 41 according to behavior of a vehicle, a state of a driving operation, etc. such that driving and parking operations can easily be performed by a driver of the vehicle. FIG. 1 is a block diagram schematically illustrating the configuration of the driving assist apparatus 100 according to this disclosure. The driving assist apparatus 100 having such a function is provided in the vehicle and includes functional elements of a vehicle state detection unit 10, a camera 21 serving as an image capturing device, a display object generation unit 31, a display type determining unit 32, an image obtaining unit 33, a display control unit 34 and the display device 41. In the driving assist apparatus 100 having such a configuration, a CPU is employed as a core member and the above-described functional elements, which perform various processes for assisting easy driving of a driver, are realized by hardware, software or both of them.

The vehicle state detection unit 10 detects at least one of the behavior of the vehicle and the state of the driving operation. As illustrated in FIG. 1, the vehicle state detection unit 10 includes a steering sensor 11, a shift position sensor 12, wheel speed sensors 13, an accelerator sensor 14 and a brake sensor 15. The following described will be described on the assumption that the vehicle state detection unit 10 according to the present embodiment detects both of the behavior of the vehicle and the state of the driving operation.

The steering sensor 11 detects a steering angle of a steering 51 (refer to FIG. 2) provided in the vehicle. The steering angle corresponds to a rotational angle when the steering 51 has rotated in the clockwise direction or the counterclockwise direction from the neutral state. The neutral state represents a state in which the direction of a steering wheel (not shown) provided in the vehicle is parallel to the width of the vehicle, that is, a state in which the vehicle can travel straight. The steering sensor 11 detecting the rotational angle of the steering 51 as described above can be formed with a Hall element. The Hall element detects a magnetic flux using a Hall effect indicating the phenomenon that when a magnetic field is applied to a conductor through which a current is flowing, electromotive force is generated by force causing charges in the conductor to move in the transverse direction.

In the case of using the Hall element as described above, it is preferred to provide a permanent magnet in the vicinity of a rotating shaft of the steering 51 and to detect the magnetic field varying depending on the rotation of the steering 51 by using the Hall element. Further, since the detection result of the Hall element is output in the form of an electric signal, the steering sensor 11 operates the steering angle of the steering 51 based on the detection result. The steering angle operated by the steering sensor 11 is transmitted to the display object generation unit 31 and the The shift position sensor 12 detects a shift position of a shift lever 52 (refer to FIG. 2) provided in the vehicle. According to the present embodiment, the shift lever 52 performs a change of a gear provided in an AT (Automatic Transmission) mechanism. Such an AT mechanism has a configuration that a driving system is fixed in a transmission, and includes a [P] range mainly used for parking, an [R] range used for backward travel, an [N] range in which the transmission is in a free state and power from an engine is not transferred to the driving system, a [D] range used for normal travel, a [2] range used when an engine brake is required in a downhill travel and the upper limit of shift up is fixed at a second gear, and a [1] range used when a strong engine brake is required in a steep downhill travel and a gear is fixed at a first gear. The AT mechanism is set to output an output voltage for each shift position corresponding to the above shift range, and the shift position sensor 12 can detect the output voltage to detect the current shift position. The detection result of the shift position detected by the shift position sensor 12 is transmitted to the display object generation unit 31 and the display type determining unit 32 which will be described later.

The wheel speed sensors 13 detect the rotational speed of wheels (not shown) provided in the vehicle. The wheel speed sensors 13 can detect the rotational speed of the wheels by using a Hall element similarly to the case of the above-described steering sensor 11. For example, it is preferred that the wheel speed sensors 13 are provided at the rotating shaft of a left front wheel and a right front wheel. As described above, the wheel speed sensors 13 are provided at the rotating shaft of the right and left wheels, so the difference between traveling forward and turning can be detected. That is, if the rotational speeds of the right and left wheels are equal to each other, it can be determined that the vehicle travels forward. However, if the rotational speeds of the right and left wheels are different from each other, it can be determined that the vehicle travels along a curved road. Further, it is preferred that the wheel speed sensors 13 are provided in at least one of the rotating shaft of the front wheels and the rotating shaft of the rear wheels which are provided in the vehicle. The detection result of the wheel speed detected by the wheel speed sensors 13 is transmitted to the display object generation unit 31 and the display type determining unit 32 which will be described later.

The accelerator sensor 14 detects the stepping amount of an accelerator pedal 53 (refer to FIG. 2) of the vehicle. The accelerator sensor 14 can also detect the stepping amount of the accelerator pedal 53 by using a Hall element similarly to the case of the above-described steering sensor 11. The accelerator sensor 14 is provided at a connection portion of the accelerator pedal 53 to electrically detect the stepping amount of the accelerator pedal 53. The detection of the stepping amount allows the opening degree and/or stepping speed of the accelerator pedal 53 to be detected. The stepping amount of the accelerator pedal 53 detected by the accelerator sensor 14 is transmitted to the display object generation unit 31 and the display type determining unit 32 which will be described later.

The brake sensor 15 detects the stepping amount of a brake pedal 54 (refer to FIG. 2) of the vehicle. The brake sensor 15 can also detect the stepping amount of the brake pedal 54 by using a Hall element similarly to the case of the above-described steering sensor 11. The brake sensor 15 is provided at a connection portion of the brake pedal 54 to electrically detect the stepping amount of the brake pedal 54. The detection of the stepping amount allows the existence of a brake operation to be detected. The stepping amount of the brake pedal 54 detected by the brake sensor 15 is transmitted to the display object generation unit 31 and the display type determining unit 32 which will be described later.

As described above, the steering sensor 11, the shift position sensor 12, the wheel speed sensors 13, the accelerator sensor 14 and the brake sensor 15 detect the behavior of the vehicle and the state of the driving operation, thereby constituting the vehicle state detection unit 10. The behavior of the vehicle is defined based on the speed and/or acceleration of the vehicle. The vehicle speed and/or acceleration, for example, can be specified from the detection result of the shift position sensor 12, the wheel speed sensors 13, the accelerator sensor 14, the brake sensor 15, etc. Further, the state of the driving operation is defined based on the steering speed and/or steering acceleration of the steering 51. The steering speed and/or steering acceleration, for example, can be specified from the detection result of the steering sensor 11.

The camera 21 corresponds to an image capturing device provided in the vehicle. The camera 21 captures a scene at the rear of the vehicle. Such a camera 21, for example, includes a CCD (Charge Coupled Device), a CIS (CMOS image sensor), etc. to perform an image capturing operation in real-time. The camera 21 is installed at the vicinity of a license plate provided at an outer rear side of the vehicle, at the vicinity of an emblem provided at an outer rear side of the vehicle, etc. It is, for example, preferred that the camera 21 is equipped with a wide-angle lens, of which each right and left angle of view is about 140°. Further, the camera 21 is arranged at the rear of the vehicle to be angled by about 30° toward a lower side of the vehicle and captures a view of a rear area from the vehicle up to about 8m. Consequently, it is possible to capture the view of the rear of the vehicle in a wide range. A peripheral image, which is obtained by capturing the surroundings of the vehicle through the camera 21, is transmitted to the image obtaining unit 33 which will be described later.

The image obtaining unit 33 obtains the peripheral image of the vehicle, which is captured by the camera 21. According to the present embodiment, the camera 21 is installed toward the rear of the vehicle. In this regard, the peripheral image of the vehicle corresponds to a rear image including at least the rear of the vehicle. The image obtaining unit 33 obtains the rear image from the camera 21. The rear image is obtained as picked-up image data which is image data available by the functional elements of the driving assist apparatus 100. According to this disclosure, since it is not necessary to distinguish the image data from the picked-up image data, the peripheral image will be representatively described in the following description if not otherwise specified. The peripheral image obtained by the image obtaining unit 33 is transmitted to the display control unit 34 which will be described later.

The display object generation unit 31 generates a display object including an index line serving as an index for assisting a driver who drives the vehicle. According to the present embodiment, the index for assisting the driver is displayed in order to prevent the vehicle from making contact with a peripheral obstacle when the vehicle is reversed. An index line corresponds to one example of such an index. According to the present embodiment, the index line corresponds to backward expected lines 71 indicating a rear-end expected locus of the vehicle in accordance with the steering angle of the vehicle which is being reversed, and vehicle-backward lines 75 extending in the front-rear direction of the vehicle from lateral sides of the vehicle. Such an index line is displayed as a display object in the present embodiment. The display object generation unit 31 generates the backward expected lines 71 operated according to the steering angle, shift position and wheel speed of the vehicle. Information representing the steering angle is transmitted from the steering sensor 11. The shift position is transmitted from the shift position sensor 12. Further, the wheel speed is transmitted from the wheel speed sensor 13. The display object generation unit 31 generates the backward expected lines 71 by using these pieces of information.

Herein, in order to prevent the vehicle from making contact with an object existing in the vicinity of the vehicle, when the vehicle makes reverse left turn, it is preferred that the backward expected line 71 indicates the locus of a right front end and a left rear end of the vehicle. Further, when the vehicle makes reverse right turn, it is preferred that the backward expected line 71 indicates the locus of a left front end and a right rear end of the vehicle. The display object generation unit 31 generates the backward expected line 71 and transmits the backward expected line 71 to the display control unit 34 which will be described later. In addition, the display object generated by the display object generation unit 31 is displayed on the display device 41, which will be described later, as a mirrored image. The display device 41 is arranged toward the rear of the vehicle to display a peripheral image which is equal to a scene viewed when a driver seeing the display device 41 looks around and faces up squarely the rear of the vehicle.

The display type determining unit 32 determines a transparent display type of the display object based on the detection result of the vehicle state detection unit 10. The detection result of the vehicle state detection unit 10 corresponds to the behavior of the vehicle and the state of the driving operation in the present embodiment. The behavior of the vehicle includes the vehicle speed and/or acceleration of the vehicle as described above, and, for example, is specified from the detection result of the shift position sensor 12, the wheel speed sensors 13, the accelerator sensor 14, the brake sensor 15, etc. Further, the state of the driving operation includes the steering speed and/or steering acceleration as described above, and is specified from the detection result of the steering sensor 11. The display object includes the index line such as the backward expected line 71 and the vehicle-backward line 75. The transparent display type represents the display type of the display object, and in detail corresponds to transparency, intensity and/or brightness (details thereof will be described later). The display type determining unit 32 determines transparency, intensity and/or brightness of the display object based on the speed and/or acceleration of the vehicle or the steering speed and/or steering acceleration of the steering 51. According to the present embodiment, for the purpose of convenience, the following description will be given on the assumption that the transparent display type denotes the transparency of the display object.

In more detail, the display type determining unit 32 determines the transparent display type so as to increase the transmittance of the display object when the vehicle speed or acceleration exceeds a setting value set in advance. However, when the vehicle speed and acceleration are equal to or less than the setting value set in advance, the display type determining unit 32 determines the transparent display type in such a manner that the transmittance of the display object is decreased. Further, when the steering speed or steering acceleration exceeds the setting value set in advance, the display type determining unit 32 determines the transparent display type so as to increase the transmittance of the display object. However, when the steering speed and steering acceleration are equal to or less than the setting value set in advance, the display type determining unit 32 determines the transparent display type in such a manner that the transmittance of the display object is decreased. Herein, the setting value set in advance is separately set with respect to each of the vehicle speed, the acceleration, the steering speed and the steering acceleration. Further, an increase in the transmittance of the display object corresponds to an increase in the transparency of the display object, and a decrease in the transmittance of the display object corresponds to a decrease in the transparency of the display object. As described above, the transparent display type of the display object (transparency in the present embodiment) determined by the display type determining unit 32 is transmitted to the display control unit 34 which will be described later.

The display control unit 34 superimposes and displays the display object on the peripheral image, which is displayed on the display device 41, based on the determined transparent display type. The display device 41 is provided in the interior of the vehicle to display the peripheral image. According to the present embodiment, the peripheral image denotes the rear image of the vehicle which is captured by the camera 21 and then obtained. The determined transparent display type indicates the transparent display type (transparency) determined by the display type determining unit 32. According to the present embodiment, the display object includes the index line such as the backward expected line 71 and/or the vehicle-backward line 75, which are generated by display object generation unit 31. Thus, the display control unit 34 superimposes and displays the index line such as the backward expected line 71 and/or the vehicle-backward line 75 on the peripheral image displayed on the display device 41. Further, when the display object is superimposed and displayed on the peripheral image, the display object is displayed according to the transparency determined by the display type determining unit 32.

In more detail, when the transparent display type is determined by the display type determining unit 32 so as to increase the transparency of the display object, the display control unit 34 increases the transparency of the display object and superimposes and displays the display object on the peripheral image. Thus, a driver can easily recognize the peripheral image of the portion in which the display object is superimposed. Meanwhile, when the transparent display type is determined by the display type determining unit 32 in such a manner that the transparency of the display object is reduced, the display control unit 34 reduces the transparency of the display object and superimposes and displays the display object on the peripheral image. Consequently, it is possible to prevent a driver from paying attention only to a portion of the peripheral image, in which the display object is superimposed.

The driving assist apparatus 100 has the above configuration, determines the transparency of the index line such as the backward expected line 71 and the vehicle-backward line 75 in order to assist driving according to the states of the vehicle, and superimposes the index line on the peripheral image based on the determined transparency. Consequently, a driver can appropriately recognize the surroundings of the vehicle without being obstructed by the index line. Further, since the transparency is determined according to the states of the vehicle, the index line is superimposed and displayed on the peripheral image such that the index line can be easily viewed (e.g., in an opaque state) when the vehicle is located adjacent to an obstacle, so that a driver can pay attention to the obstacle located adjacent to the vehicle.

Figure 2:
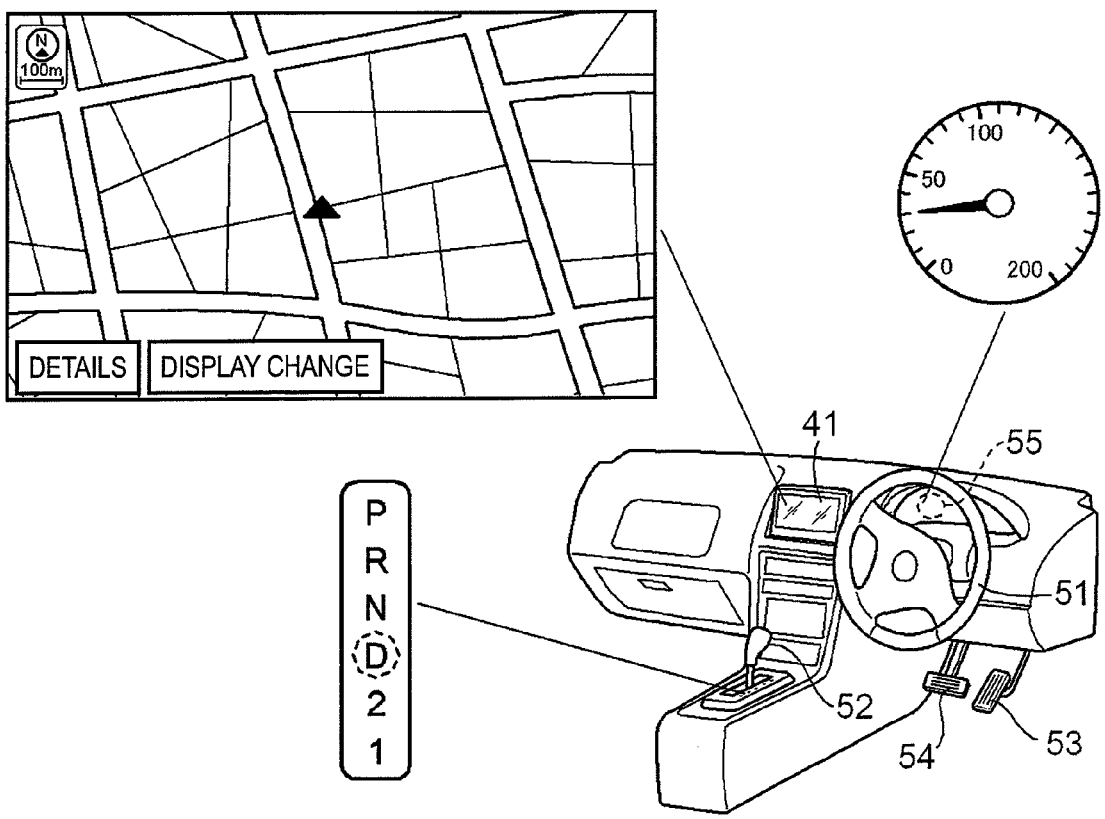
FIG. 2 is a diagram schematically illustrating a display screen, the behavior of a vehicle and the state of a driving operation in the case of backward travel.

Next, examples of the display object displayed on the display device 41 according to the transparent display type determined based on the behavior of the vehicle, the state of the driving operation, etc. will be described with reference to the accompanying drawings. FIGS. 2 to 6 are diagrams illustrating the display displayed on the display device 41 when the vehicle is reversed. FIG. 2 illustrates a state in which the vehicle travels at a predetermined speed (about 30 km/hour in the example of FIG. 2) as shown in a speedometer 55. Further, since the shift position of the shift lever 52 is set to the "D range", it can be determined that the vehicle is traveling forward at the predetermined speed. In addition, FIG. 2 illustrates a display image displayed on the display device 41 at that time. The steering 51 is steered at a predetermined steering angle. When the vehicle is traveling forward as described above, for example, the display image may be a map image of a navigation system, an image displayed on a DVD, or a television broadcast image. FIG. 2 illustrates an example in which the map image is displayed.

Figure 3:
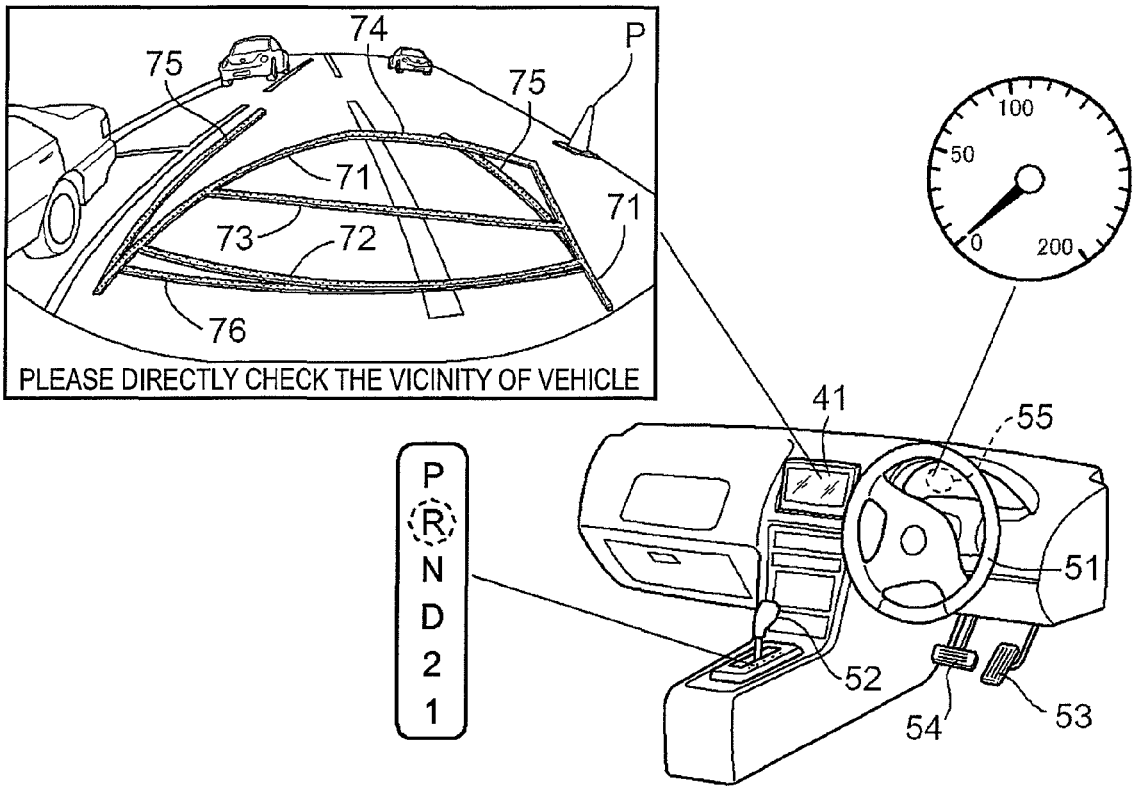
FIG. 3 is a diagram schematically illustrating a display screen, the behavior of a vehicle and the state of a driving operation in the case of backward travel.

FIG. 3 illustrates a state in which a driver stops the vehicle (refer to the speedometer 55 of FIG. 3: the speed of the vehicle is 0 km/hour) from the state of FIG. 2 in order to reverse the vehicle, and the shift position of the shift lever 52 is changed to the "R range (reverse position)". If the shift position of the shift lever 52 is changed to the "R range (reverse position)", the display image of the display device 41 is changed to the peripheral image of the rear of the vehicle as illustrated in FIG. 3.

Figure 7:
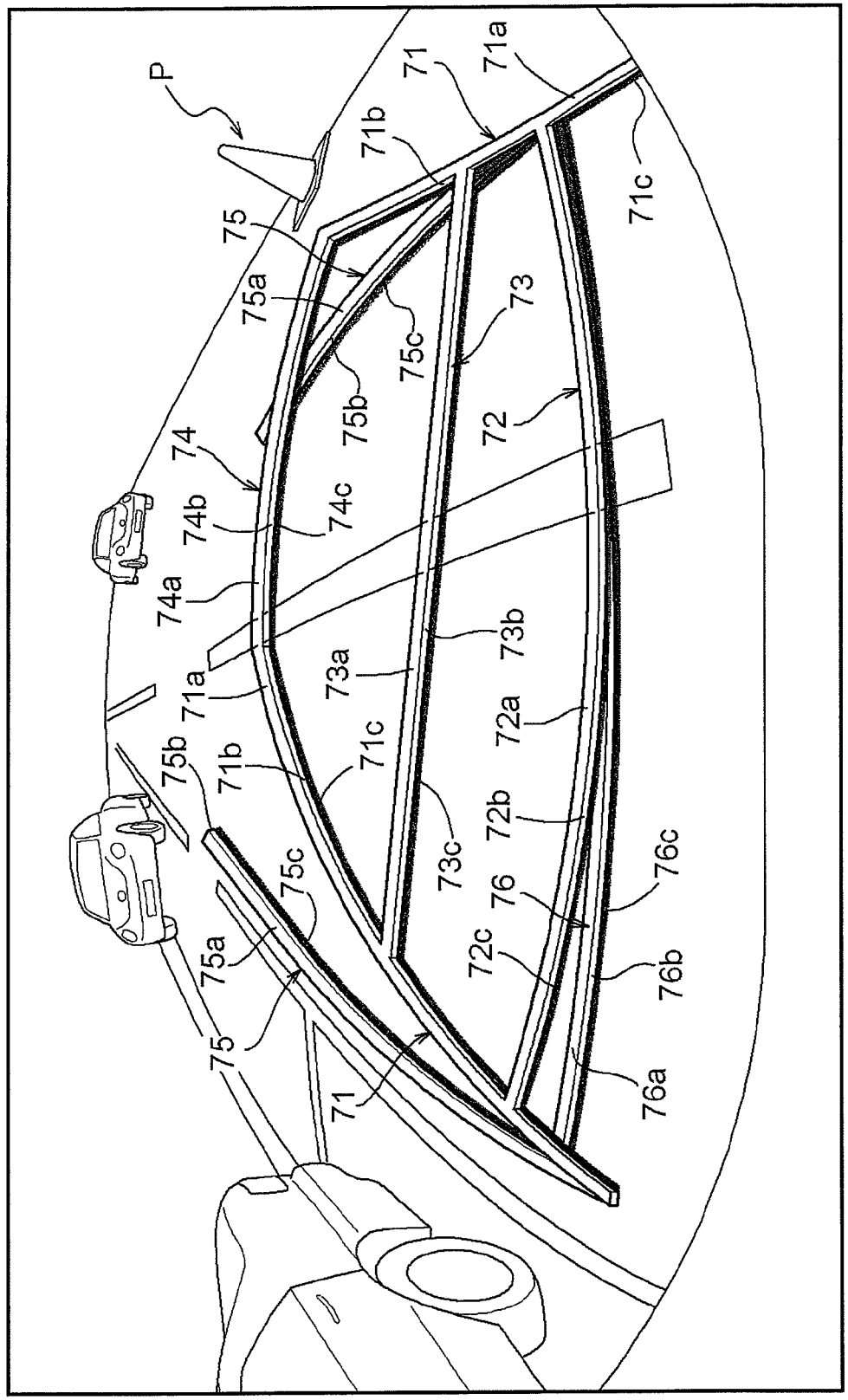
FIG. 7 is a diagram illustrating an index line according to a present embodiment.

The backward expected line 71 is superimposed and drawn on the peripheral image of the display device 41 as illustrated in FIG. 3. The backward expected line 71 serves as an index indicating the rear-end expected locus of the vehicle, which corresponds to the steering angle of the vehicle being reversed. According to the present embodiment, as illustrated in FIG. 7, the backward expected line 71 includes a rear-end expected locus line 71*a* indicating a rear-end expected locus of the vehicle, and distance reference lines 72*a* to 74*a* of the rear of the vehicle. According to the present embodiment, the distance reference lines 72*a* to 74*a* correspond to a 1 meter warning line 72*a*, a 3 meters reference line 73*a* and a 5 meters reference line 74*a*, respectively. The backward expected line 71 is basically drawn with a yellow color. However, the 1 meter warning line 72*a* is drawn with a red color in order to raise caution of a driver.

Further, the vehicle-backward line 75 is displayed on the peripheral image. The vehicle-backward line 75 is an index line indicating a predetermined position of the rear of the vehicle regardless of the steering angle of the vehicle. Thus, the vehicle-backward line 75 is superimposed and displayed on a predetermined position fixed in the peripheral image according to the optical relationship with the camera 21 provided in the vehicle. According to the present embodiment, each vehicle-backward line 75 includes vehicle width extension lines 75*a* and a 1 meter reference line 76*a* serving as a distance reference line. According to the present embodiment, for example, the vehicle-backward line 75 is displayed using a green color, that is, colors different from that of the backward expected line 71, so that the vehicle-backward line 75 can be apparently distinguished from the backward expected line 71.

According to the present embodiment, the index line includes at least one of a side portion and a shadow portion. The index line corresponds to the backward expected line 71, the vehicle-backward line 75, etc. as described above. The side portion is a side line indicating a side of the index line and the shadow portion is a shadow line indicating a shadow of the index line. According to the present embodiment, the following description will be given on the assumption that the index line is displayed using both of the side portion and the shadow portion as described above. That is, each of the backward expected line 71 and the vehicle-backward line 75 is displayed using the side portion and the shadow portion as illustrated in FIG. 7. In detail, both a side line 71*b* and a shadow line 71*c* are provided in the inner side of each of a pair of the right and left expected locus lines 71*a* of each backward expected line 71, and side lines 74*b*, 73*b* and 72*b* and shadow lines 74*c*, 73*c* and 72*c* are provided along sides of the 5 meters reference line 74*a*, the 3 meters reference line 73*a* and the 1 meter warning line 72*a*, which are located adjacent to the vehicle. Further, a side line 75*b* and a shadow line 75*c* are provided in the inner side of each of a pair of the right and left vehicle width extension lines 75*a* of each vehicle-backward line 75, and a side line 76*b* and a shadow line 76*c* are provided along the vehicle-side of the 1 meter warning line. As described above, the backward expected line 71 and the vehicle-backward line 75 are three-dimensionally superimposed and displayed on the peripheral image.

As described above, if the index line superimposed and displayed on the peripheral image is three-dimensionally displayed by the side portions, the index line is three-dimensionally displayed with respect to the peripheral image of the vehicle having a three-dimensional depth, so that the position relationship between the peripheral image and the index line can be easily recognized. In addition, since the index line with the side portions is displayed for drivers who have defects in color perception, the color area of the index line is increased, so that the index line can be easily recognized. Meanwhile, since the index line is three-dimensionally displayed for drivers who have no defects in color perception, the thickness of the line is not emphasized. As a result, an operator can obviously recognize the position relationship between the peripheral image and the index line.

Further, since the index line superimposed and displayed on the peripheral image is three-dimensionally displayed by the side portions, the index line is three-dimensionally displayed with respect to the peripheral image of the vehicle having a three-dimensional depth, so that the position relationship between the peripheral image and the index line can be easily recognized. In addition, the index line can be emphatically displayed, so that an operator can obviously distinguish the peripheral image from the index line. As a result, a driver can obviously understand the index line, and the index line can be appropriately presented to a driver. The index lines shown in FIGS. 3 to 6 are not three-dimensionally displayed for want of space. However, actually, the index lines are superimposed and displayed as three-dimensional index lines as illustrated in FIG. 7.

Referring to the state illustrated in FIG. 3, since the steering 51 maintains a steering angle equal to the steering angle illustrated in FIG. 2 and the vehicle speed is equal to or less than the setting value (e.g., 10 km/hour) set in advance, the transparency of the backward expected line 71 and the vehicle-backward line 75 is not changed. That is, the portion of the peripheral image, at which the backward expected line 71 and the vehicle-backward line 75 are superimposed, cannot be visible.

Figure 4:
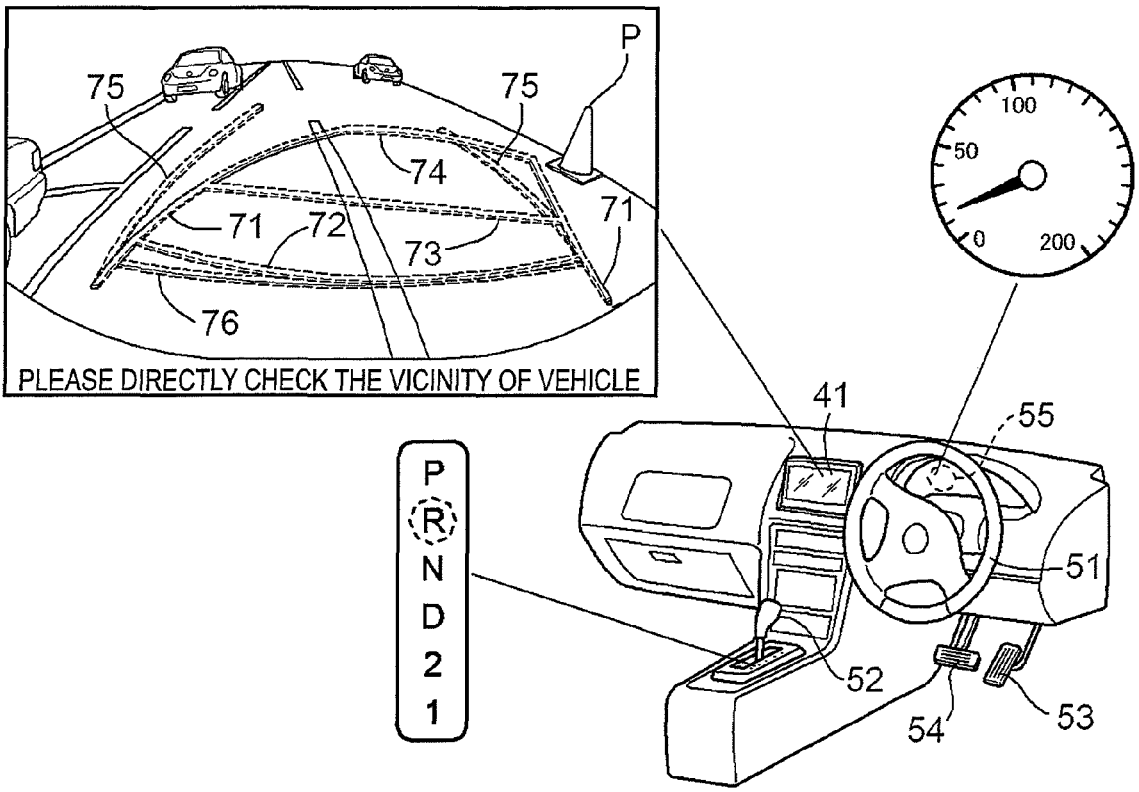
FIG. 4 is a diagram schematically illustrating a display screen, the behavior of a vehicle and the state of a driving operation in the case of backward travel.

From such a state, when the vehicle starts to move backward at a speed (e.g., 15 km/hour) exceeding the setting value (e.g., 10 km/hour) set in advance as shown in the speedometer 55 of FIG. 4, the transparency of the backward expected line 71 and the vehicle-backward line 75 is changed. According to the present embodiment, a change of the transparency results in a change to translucency. Further, various types of transparency exists in relation to the translucency. For the purpose of convenience, the following description will be given on the assumption that transmittance according to the translucency has been set to a predetermined value in advance. Further, according to the present embodiment, the transmittance is equal to 50%. Therefore, the portion of the peripheral image, at which the backward expected line 71 and the vehicle-backward line 75 are superimposed, can be transparent and visible. In such a state, the backward expected line 71 and the vehicle-backward line 75 are superimposed and displayed, so that it is possible to obtain an effect of three-dimensionally displaying the above-described index lines, and the visibility of a driver can be prevented from being reduced.

Figure 5:
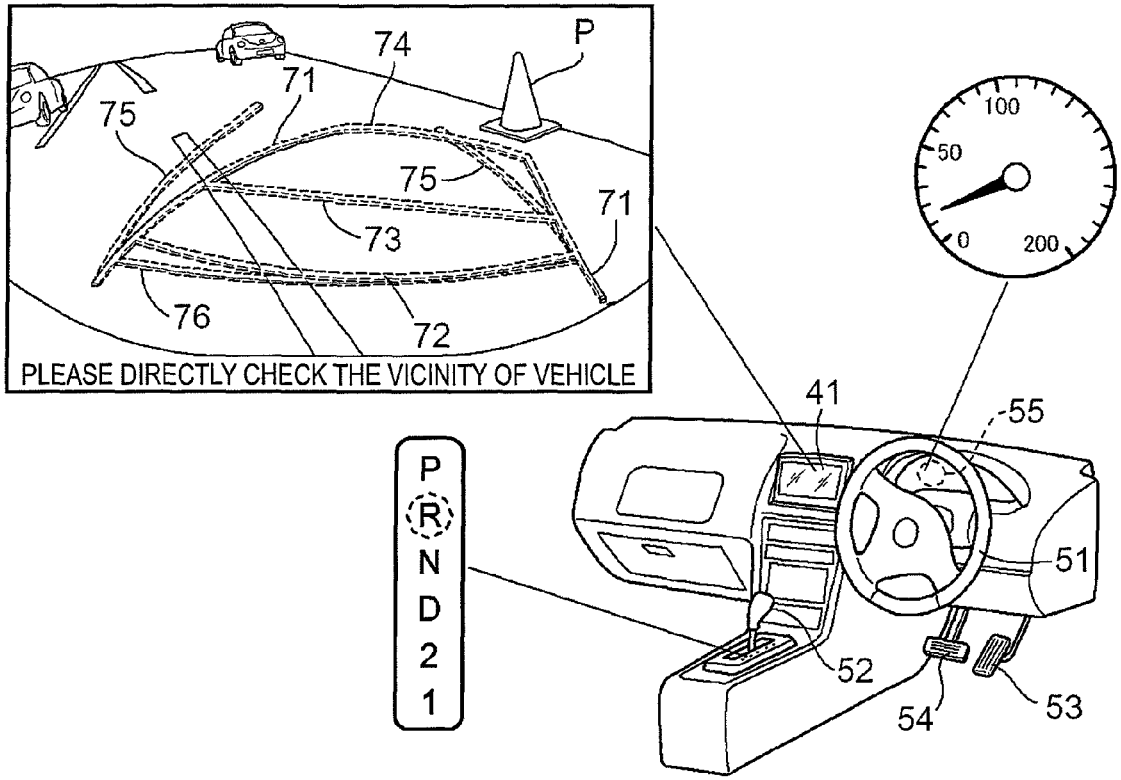
FIG. 5 is a diagram schematically illustrating a display screen, the behavior of a vehicle and the state of a driving operation in the case of backward travel.

Moreover, when the vehicle continuously moves backward at the speed (speed exceeding 10 km/hour) which is equal to the speed of FIG. 4 as illustrated in FIG. 5, the backward expected line 71 and the vehicle-backward line 75 are continuously displayed in a semi-transparent state. That is, the portion of the peripheral image, at which the backward expected line 71 and the vehicle-backward line 75 are superimposed, can be transparent and visible.

Figure 6:
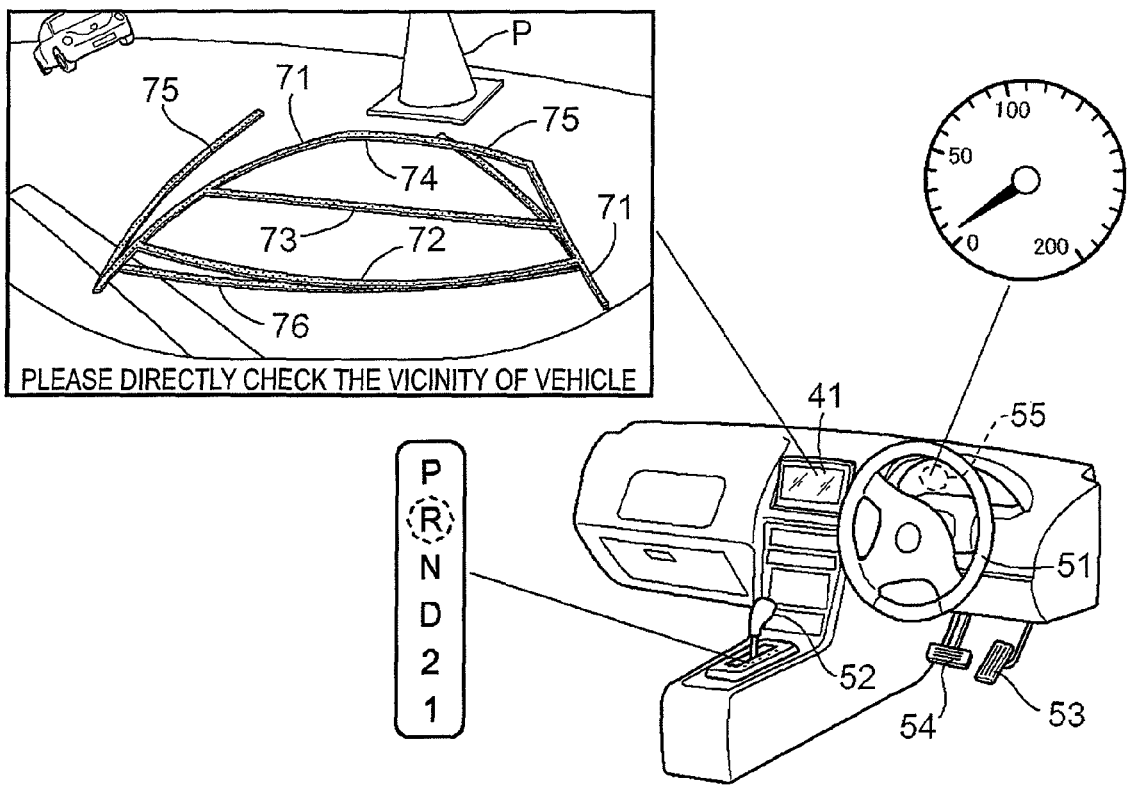
FIG. 6 is a diagram schematically illustrating a display screen, the behavior of a vehicle and the state of a driving operation in the case of backward travel.

Thereafter, when the vehicle approaches an obstacle P and the speed thereof is reduced (equal to or less than 10 km/hour) as illustrated in FIG. 6, the semi-transparent display of the backward expected line 71 and the vehicle-backward line 75 is stopped. That is, the portion of the peripheral image, at which the backward expected line 71 and the vehicle-backward line 75 are superimposed, can be transparent and invisible.

Figure 8:
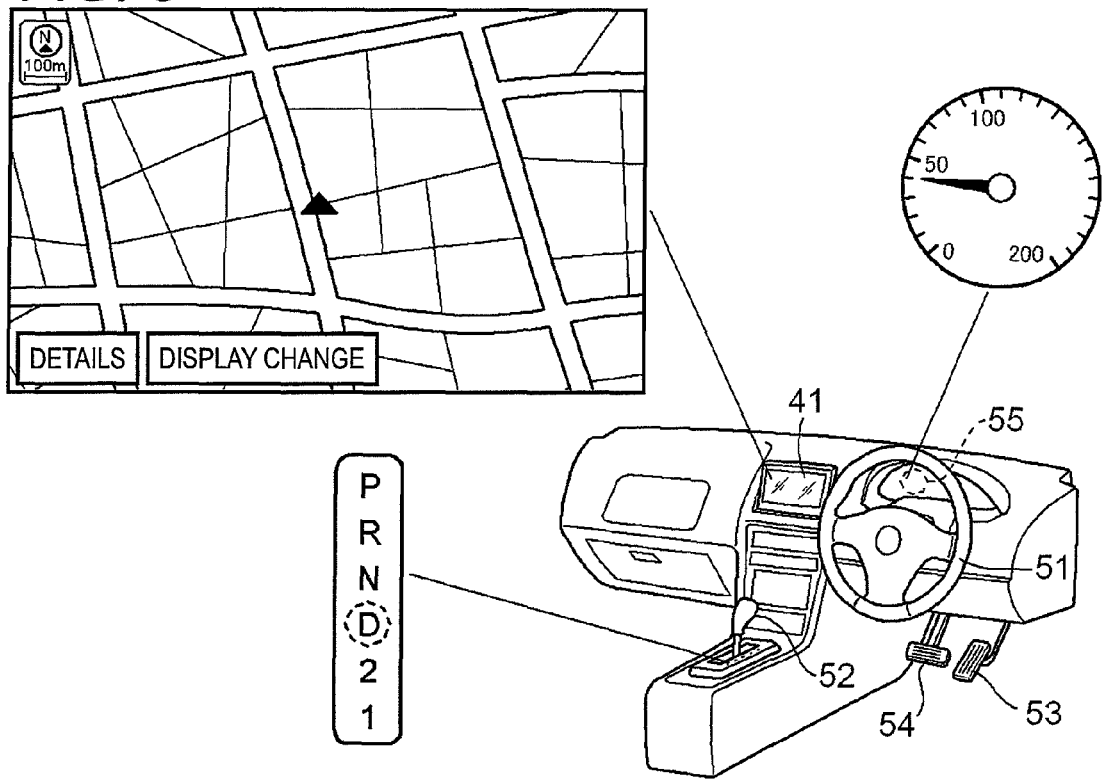
FIG. 8 is a diagram schematically illustrating a display screen, the behavior of a vehicle and the state of a driving operation in the case of longitudinal parking.

Next, an example of setting a target parking position for longitudinal parking will be described. FIGS. 8 to 12 are diagrams illustrating an example of the display displayed on the display device 41 when setting the target parking position for the longitudinal parking. FIG. 8 illustrates a state in which the vehicle travels at a predetermined speed (about 40 km/hour in the example of FIG. 8) as shown in the speedometer 55. Further, since the shift position of the shift lever 52 is set to the "D range", it can be determined that the vehicle travels forward at the predetermined speed. Further, FIG. 8 illustrates an example in which a map image is displayed on the display device 41 at that time.

Figure 9:
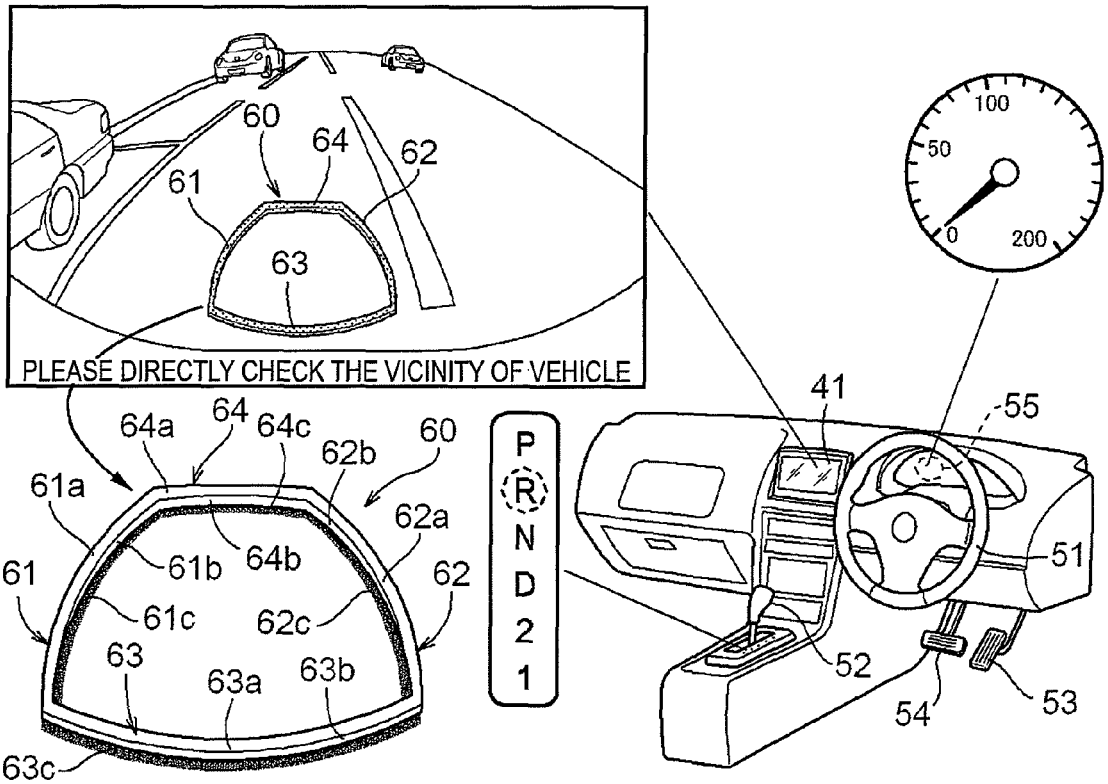
FIG. 9 is a diagram schematically illustrating a display screen, the behavior of a vehicle and the state of a driving operation in the case of longitudinal parking.

FIG. 9 illustrates a state in which a driver stops the vehicle as illustrated in FIG. 9 and changes the shift lever to the "R range (reverse position)" in order to set the target parking position from the state illustrated in FIG. 8. If the shift lever is changed to the "R range (reverse position)", the display image of the display device 41 is changed to the peripheral image of the rear of the vehicle as illustrated in FIG. 9.

A target parking position setting frame 60 is superimposed and drawn on the peripheral image of the display device 41 illustrated in FIG. 9, and includes a pair of right and left parking frame lines 61a and 62a which extend in the travel direction of the vehicle. A side line 61b and a shadow line 61c are provided in the inner side of a left parking frame line 61a, and a side line 62b and a shadow line 62c are provided in the inner side of a right parking frame line 62a. In relation to a pair of parking frame lines 63a and 64a which extend in the direction perpendicular to the pair of right and left parking frame lines 61a and 62a, a side line 63b and a shadow line 63c and a side line 64b and a shadow line 64c are provided along the side adjacent to the vehicle. As described above, the target parking position setting frame 60 is three-dimensionally superimposed and displayed on the peripheral image.

In such a state, since the steering 51 maintains a steering angle which is equal to that in the state of FIG. 8 and the vehicle speed is equal to or less than the setting value (e.g., 10 km/hour) set in advance, transparency of the target parking position setting frame 60 is not changed. That is, a portion of the peripheral image, at which the target parking position setting frame 60 is superimposed, cannot be visible.

Figure 10:
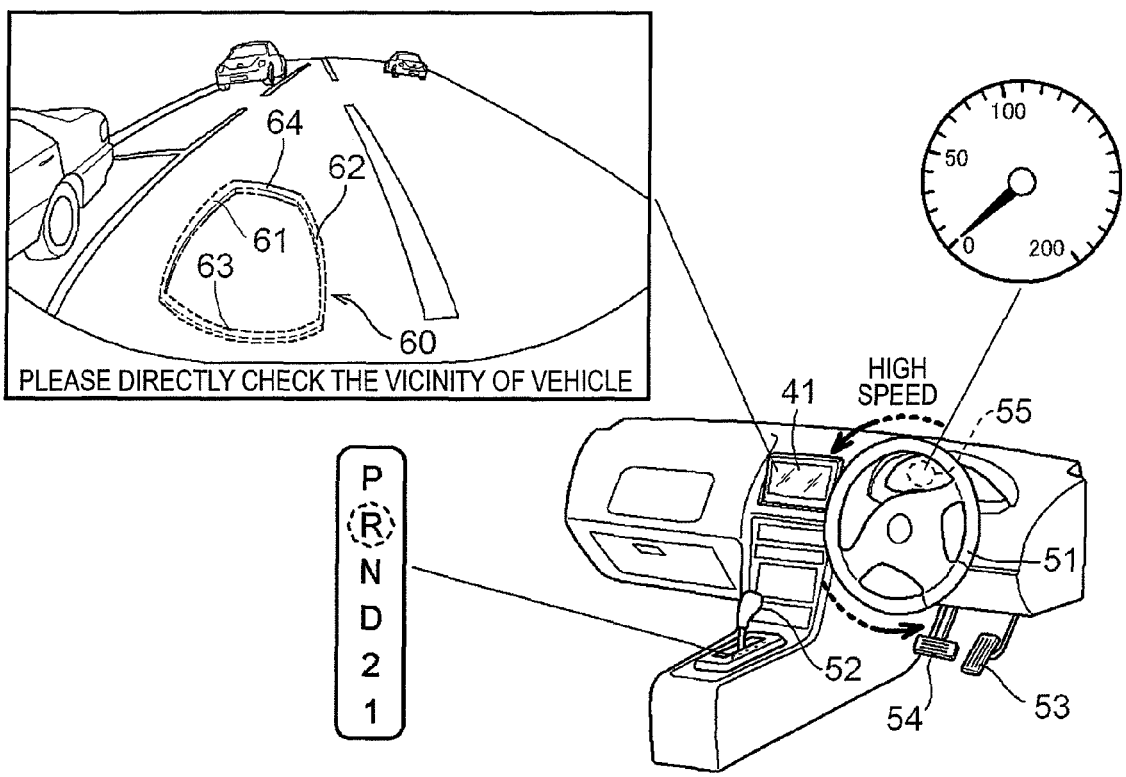
FIG. 10 is a diagram schematically illustrating a display screen, the behavior of a vehicle and the state of a driving operation in the case of longitudinal parking.

As illustrated in FIG. 10, when the steering 51 is steered in the counterclockwise direction, the target parking position setting frame 60 is moved in the left direction on the display screen of the display device 41. When the steering speed of the steering 51 at that time exceeds the setting value set in advance, that is, when the vehicle is rotated at a high speed, the target parking position setting frame 60 is displayed in a semi-transparent state. That is, the portion of the peripheral image, at which the target parking position setting frame 60 is superimposed, can be transparent and visible. In addition, referring to FIG. 10, the steering speed of the steering 51 is indicated by the length of an arrow for the purpose of convenience, and the steering speed is increased as the length of the arrow is lengthened.

Figure 11:
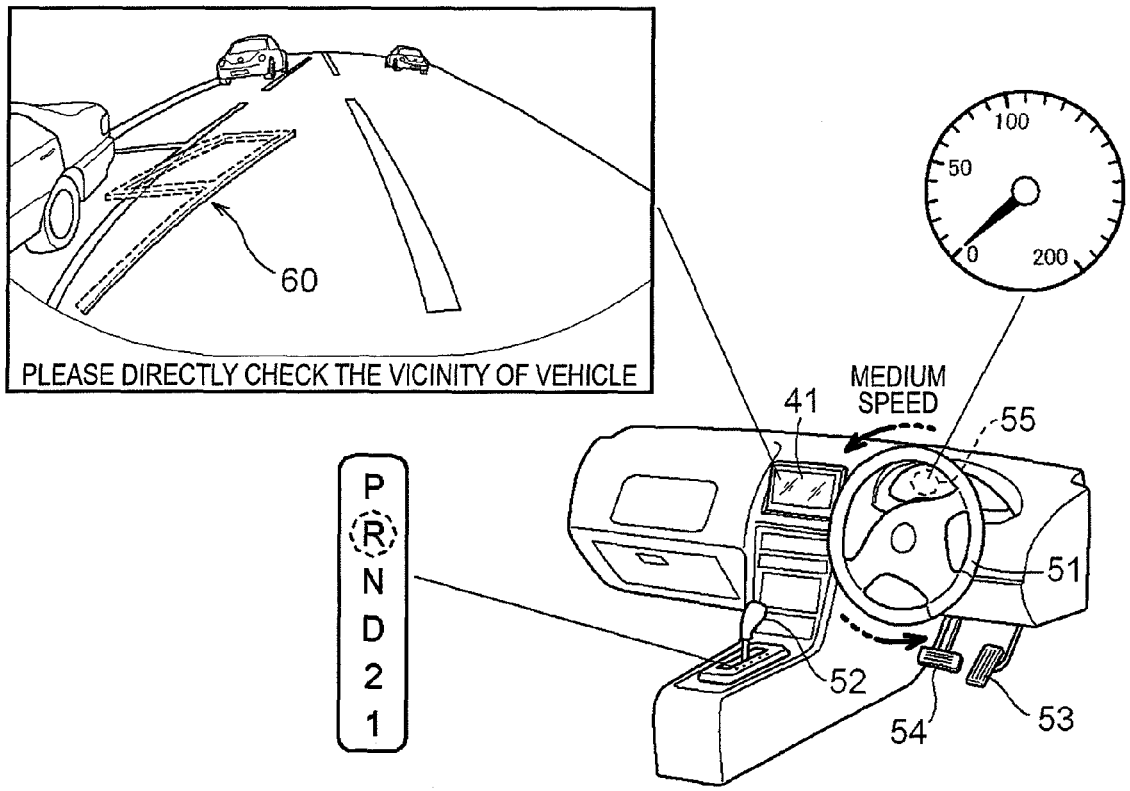
FIG. 11 is a diagram schematically illustrating a display screen, the behavior of a vehicle and the state of a driving operation in the case of longitudinal parking.

In addition, when the steering 51 is steered at a medium speed as illustrated in FIG. 11, the target parking position setting frame 60 is continuously displayed in the semi-transparent state. That is, the portion of the peripheral image, at which the target parking position setting frame 60 is superimposed, can be transparent and visible. Moreover, since the target parking position setting frame 60 illustrated in FIG. 11 has approached the target parking position specified by an image recognition process, the shape of the target parking position setting frame 60 is changed and displayed. This display will be omitted because it belongs to the related art.

Figure 12:
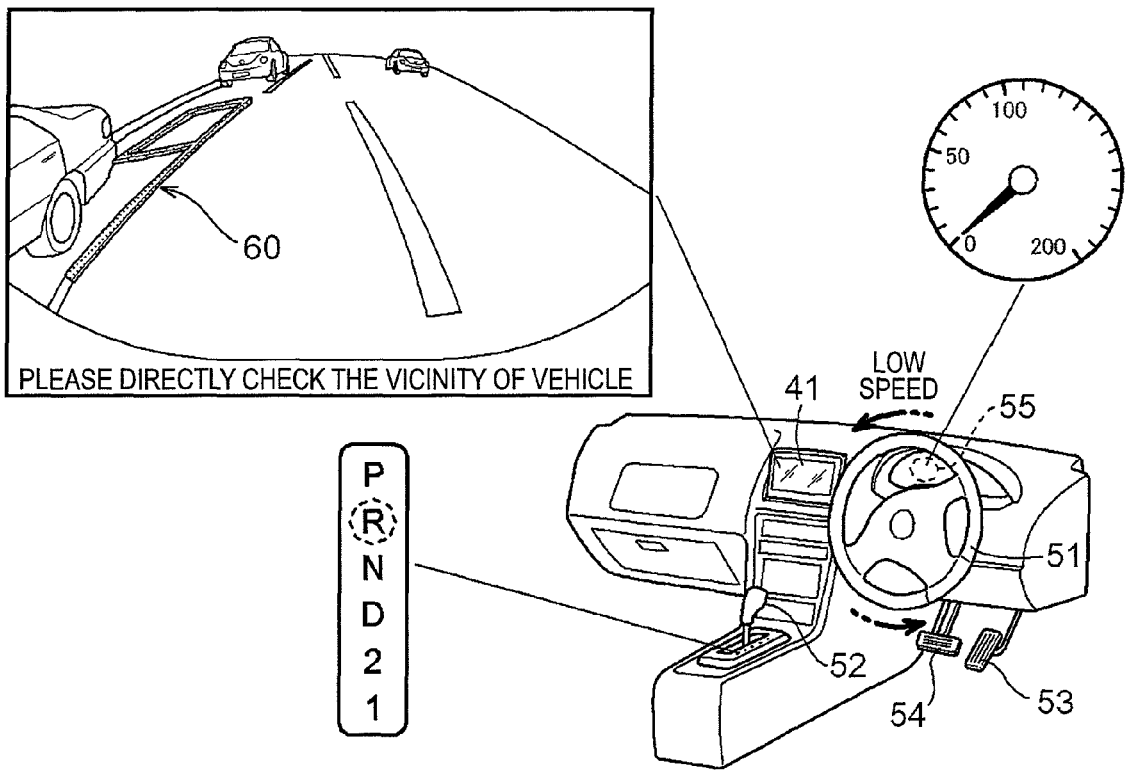
FIG. 12 is a diagram schematically illustrating a display screen, the behavior of a vehicle and the state of a driving operation in the case of longitudinal parking.

Thereafter, when the target parking position setting frame 60 has approached the target parking position specified by the image recognition process as illustrated in FIG. 12 and the steering speed of the steering 51 is equal to or less than the setting value set in advance, that is, when the vehicle is steered at a low speed, the semi-transparent display of the target parking position setting frame 60 is stopped. That is, the portion of the peripheral image, at which the target parking position setting frame 60 is superimposed, can be transparent and invisible.

Figure 13:
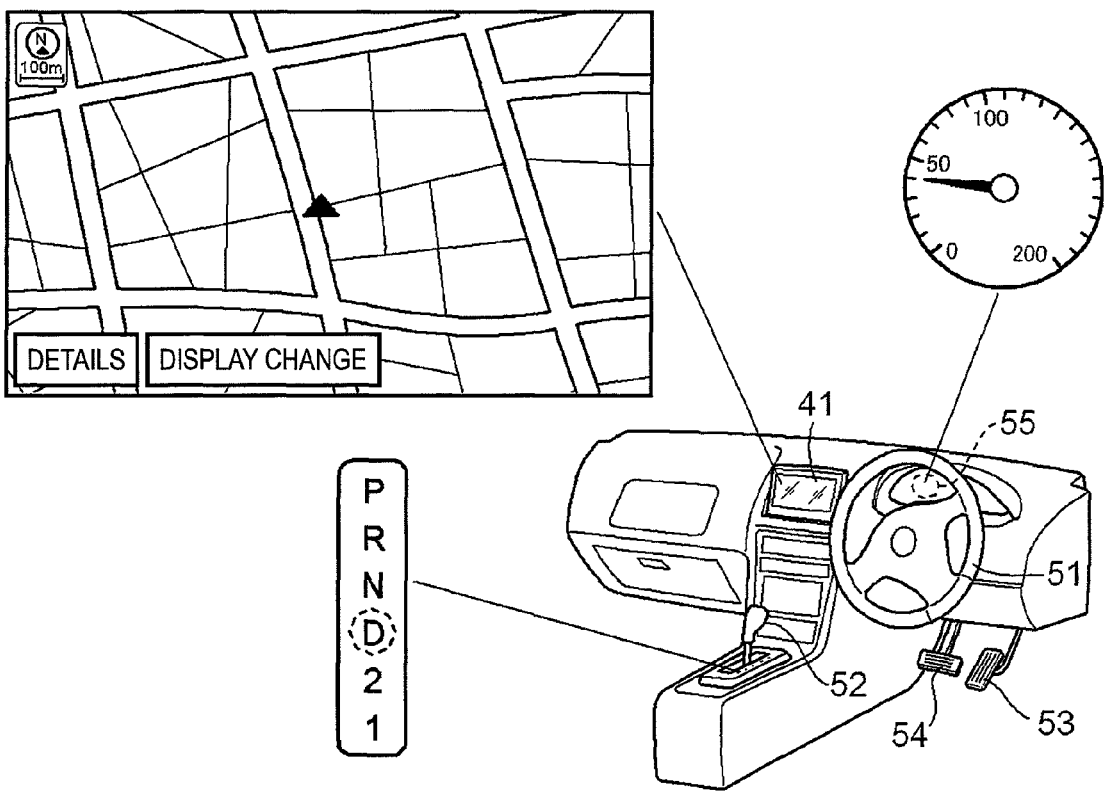
FIG. 13 is a diagram schematically illustrating a display screen, the behavior of a vehicle and the state of a driving operation in the case of parallel parking.

Next, an example in which the steering 51 is steered for parallel parking, direction change will be described. FIGS. 13 to 17 are diagrams illustrating the display displayed on the display device 41 when the steering 51 is steered. FIG. 13 illustrated a state in which the vehicle travels at a predetermined speed (about 40 km in the example of FIG. 13) as shown in the speedometer 55. Further, since the shift position of the shift lever 52 is set to the "D range", it can be determined that the vehicle is traveling forward at the predetermined speed. In addition, FIG. 13 illustrates an example in which a map image displayed on the display device 41 at that time. Moreover, the steering 51 is steered at a predetermined steering angle.

Figure 14:
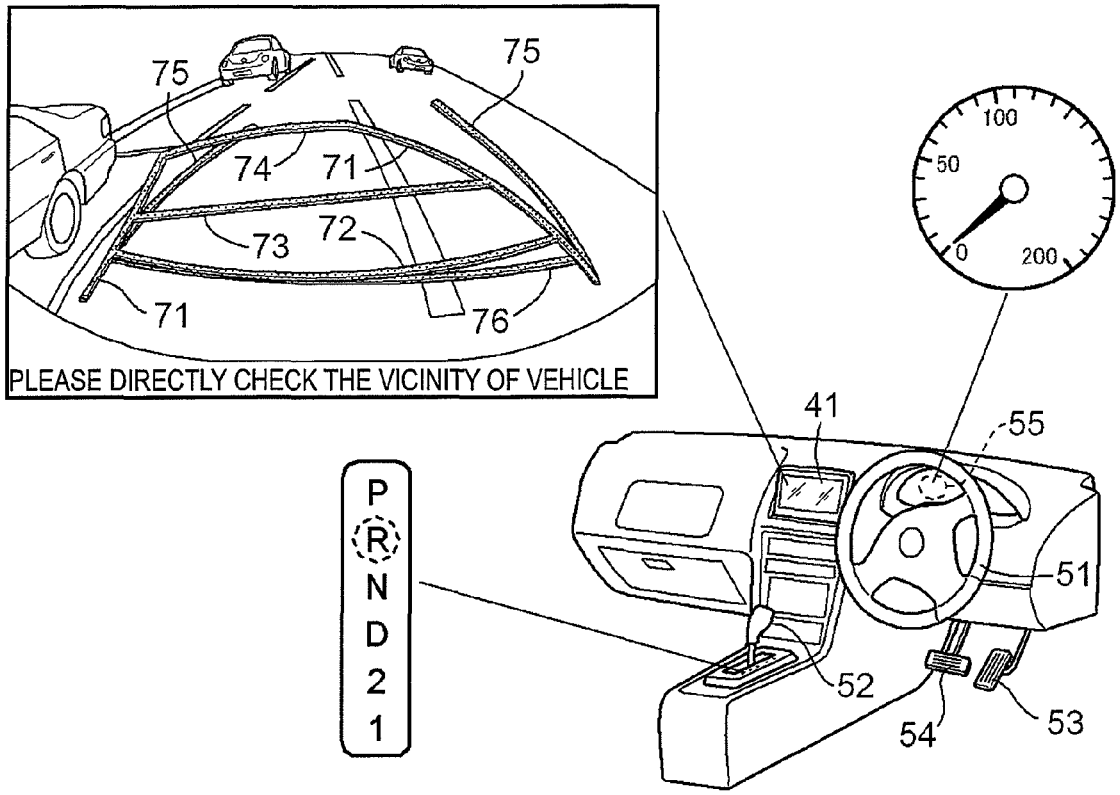
FIG. 14 is a diagram schematically illustrating a display screen, the behavior of a vehicle and the state of a driving operation in the case of parallel parking.

FIG. 14 illustrates a state in which a driver stops the vehicle as illustrated in FIG. 14 and changes the shift lever to the "R range (reverse position)" in order to set the target parking position from the state illustrated in FIG. 13. If the shift lever is changed to the "R range (reverse position)", the display image of the display device 41 is changed to the peripheral image of the rear of the vehicle as illustrated in FIG. 14.

The backward expected line 71 and the vehicle-backward line 75 are superimposed and drawn on the peripheral image of the display device 41 illustrated in FIG. 14. Even in the present embodiment, the backward expected line 71 and the vehicle-backward line 75 are three-dimensionally displayed. Further, in such a state, since the steering 51 maintains a steering angle which is equal to that in the state of FIG. 13 and the vehicle speed is equal to or less than the setting value (e.g., 10 km/hour) set in advance, transparency of the backward expected line 71 and the vehicle-backward line 75 is not changed. That is, a portion of the peripheral image, at which the backward expected line 71 and the vehicle-backward line 75 are superimposed, cannot be visible.

Figure 15:
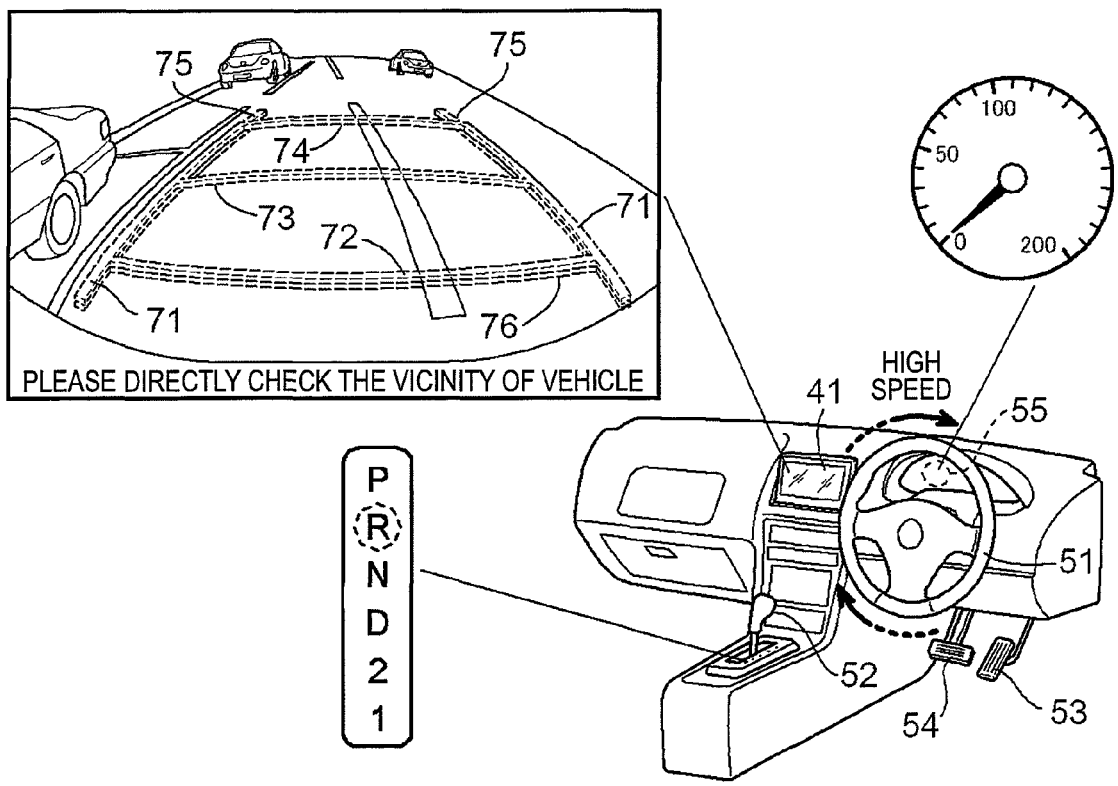
FIG. 15 is a diagram schematically illustrating a display screen, the behavior of a vehicle and the state of a driving operation in the case of parallel parking.

As illustrated in FIG. 15, when the steering 51 is steered in the clockwise direction, the backward expected line 71 and the vehicle-backward line 75 are moved in the right direction on the display screen of the display device 41. When the steering speed of the steering 51 at that time exceeds the setting value set in advance, that is, when the vehicle is steered at a high speed, the backward expected line 71 and the vehicle-backward line 75 are displayed in a semi-transparent state. That is, the portion of the peripheral image, at which the backward expected line 71 and the vehicle-backward line 75 are superimposed with, can be transparent and visible. In addition, referring to FIG. 15, the steering speed of the steering 51 is indicated by the length of an arrow for the purpose of convenience, and the steering speed is increased as the length of the arrow is lengthened.

Figure 16:
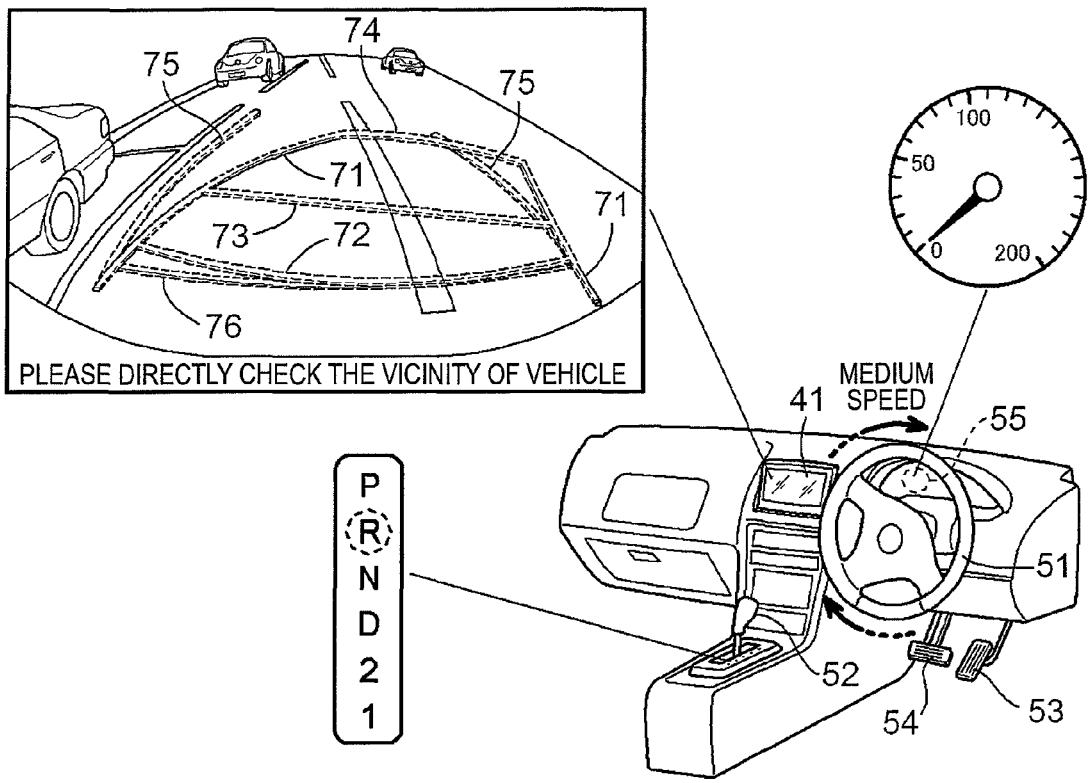
FIG. 16 is a diagram schematically illustrating a display screen, the behavior of a vehicle and the state of a driving operation in the case of parallel parking.

In addition, when the steering 51 is steered at a medium speed as illustrated in FIG. 16, the backward expected line 71 and the vehicle-backward line 75 are continuously displayed in the semi-transparent state. That is, the portion of the peripheral image, at which the backward expected line 71 and the vehicle-backward line 75 are superimposed, can be transparent and visible.

Figure 17:
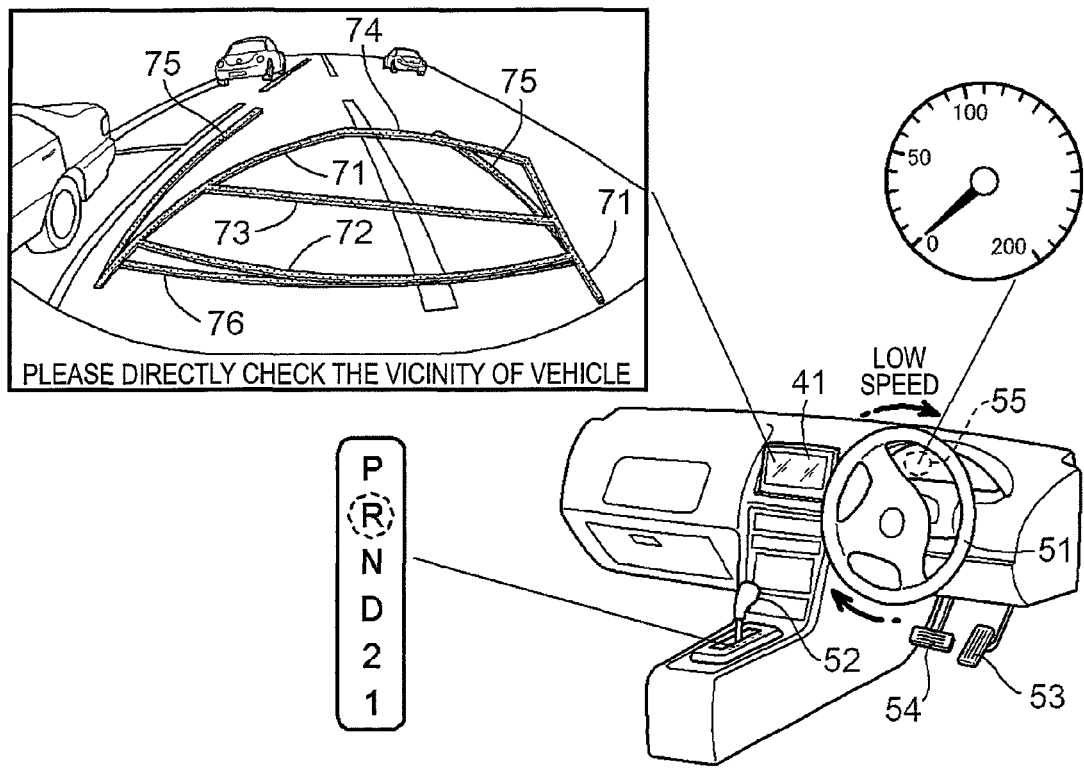
FIG. 17 is a diagram schematically illustrating a display screen, the behavior of a vehicle and the state of a driving operation in the case of parallel parking.

Thereafter, when the steering speed of the steering 51 is equal to or less than the setting value set in advance as illustrated in FIG. 17, that is, when the vehicle is steered at a low speed, the semi-transparent display of the backward expected line 71 and the vehicle-backward line 75 is stopped. That is, the portion of the peripheral image, at which the backward expected line 71 and the vehicle-backward line 75 are superimposed, can be transparent and invisible.

As described above, according to the driving assist apparatus 100, transparency of the display object superimposed and displayed on the peripheral image is determined according to the states of the vehicle, and the peripheral image and the display object are displayed on the display device 41. Consequently, when a driver must pay attention to the surroundings of the vehicle, the surroundings of the vehicle can be prevented from being invisible by the display object. That is, the visibility in the surroundings of the vehicle can be enhanced.

Other Embodiments

Figure 18:
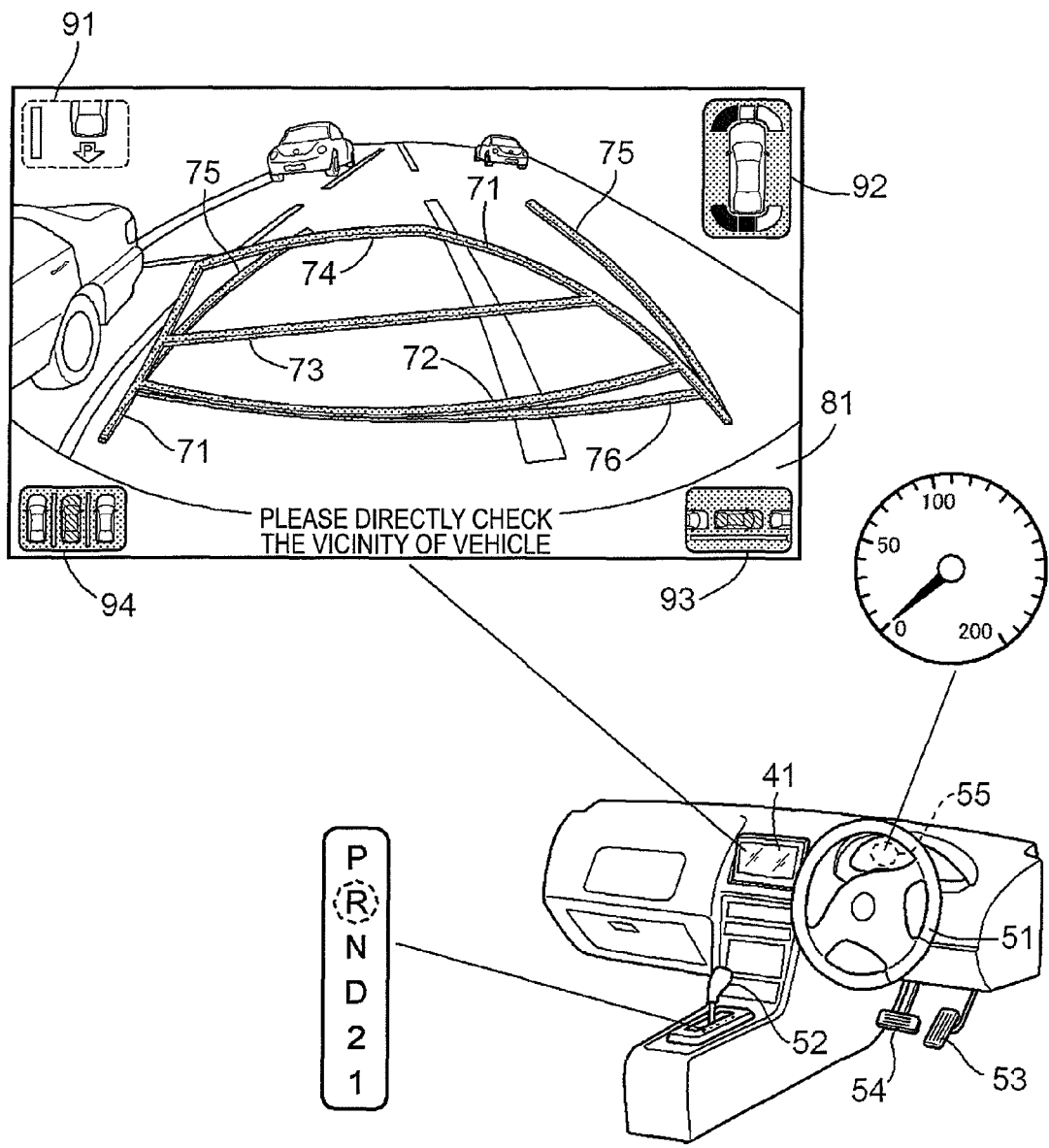
FIG. 18 is a diagram schematically illustrating a display screen, the behavior of a vehicle and the state of a driving operation according to other embodiments.

In the previous embodiments, the display type determining unit 32 decides the transparent display type of the backward expected line 71 and the vehicle-backward line 75 and/or the target parking position setting frame 60. However, the scope of the present invention is not limited thereto. For example, it is possible to decide the transparent display type of an operation switch for performing control for driving assist or an indicator for indicating various control states, which are displayed on the display device 41. FIG. 18 illustrates an example in which various operation switches and various indicators are superimposed and displayed on the peripheral image.

For example, when the driving assist apparatus 100 is provided with an automatic parking assist system, an operation switch 91 for starting the automatic parking assist system is superimposed and displayed on the peripheral image. Further, when a vehicle on which the driving assist apparatus 100 is mounted is provided with a clearance sonar that detects the existence of an obstacle in the vicinity of the vehicle, an icon 92 for showing the detection state is also superimposed and displayed on the peripheral image. In addition, operation switches 93 and 94 for selecting control for longitudinal parking and/or control for parallel parking are also superimposed and displayed on the peripheral image.

As with the operation switch 91 for starting the automatic parking assist system, an operation switch, which does not require an additional operation by a driver after being operated for the first time, is preferably displayed in a semi-transparent state. Further, since the icon 92 for showing the detection state of the clearance sonar is available for preventing the vehicle from colliding with an obstacle in the process of controlling automatic parking assist, the icon 92 is superimposed in a normal form (not semi-transparent display) such that a driver can easily recognize the detection state. Further, since the operation switches 93 and 94 for selecting control for longitudinal parking and/or control for parallel parking do not require an additional operation by a driver after being operated for the first time similarly to the above-described operation switch 91, they may also be displayed in a semi-transparent state. Furthermore, since the operation switches 93 and 94 are located on a bumper 81 in relation to the peripheral image, even if they are displayed in the semi-transparent state, it does not have any significance. Thus, they may not be displayed in the semi-transparent state.

In the previous embodiments, when the backward expected line 71 and the vehicle-backward line 75 are superimposed, they are displayed in the semi-transparent state according to the states of the vehicle. However, the scope of the present invention is not limited thereto. For example, it is possible to employ a configuration in which only one of the backward expected line 71 and the vehicle-backward line 75 is displayed in the semi-transparent state. With such a configuration, even if the backward expected line 71 overlaps the vehicle-backward line 75, they can be obviously distinguished from each other, so that the visibility can be enhanced.

In the previous embodiments, when the vehicle speed exceeds the km/hour, the transparency of the index line is changed. However, the scope of the present invention is not limited thereto. Since the 10 km/hour is just an example, other values can be set. Further, in the previous embodiments, the steering speed of the steering is divided into a high speed, a medium speed and a low speed. However, the steering speed can be set to detailed numerical values.

In the previous embodiments, the backward expected line 71 and the vehicle-backward line 75 superimposed and displayed on the peripheral image are three-dimensional. However, the scope of the present invention is not limited thereto. For example, the transparent display type of the backward expected line 71 and the vehicle-backward line 75, which are not three-dimensional, can be changed and then superimposed and displayed on the peripheral image.

In the previous embodiments, the index line is displayed using both the side portion and the shadow portion. However, the scope of the present invention is not limited thereto. For example, the index line can be displayed using only one of the side portion and the shadow portion.

In the previous embodiments, a change of the transparent display type of the index line superimposed and displayed on the peripheral image results in a change of transparency. However, the scope of the present invention is not limited thereto. For example, in relation to the change of the transparent display type, brightness and/or intensity of the index line can also be changed to enhance the visibility of the peripheral image, or the line width of the index line can also be changed to enhance the visibility of the peripheral image.

In the previous embodiments, when the display object is semi-transparently displayed, the transmittance thereof is set to 50%. However, the scope of the present invention is not limited thereto. Since the transmittance of 50% is just an example, the transmittance can be set to other values.

In the previous embodiments, the vehicle state detection unit 10 detects both the behavior of the vehicle and the state of the driving operation. However, the scope of the present invention is not limited thereto. For example, the vehicle state detection unit 10 can detect either the behavior of the vehicle or the state of the driving operation. That is, the vehicle state detection unit 10 can detect the behavior of the vehicle, or the vehicle state detection unit 10 can detect the state of the driving operation.

In the previous embodiments, when the vehicle speed or acceleration exceeds the setting value set in advance, the display type determining unit 32 decides the transparent display type so as to increase the transmittance of the display object. Further, when the steering speed or steering acceleration exceeds the setting value set in advance, the display type determining unit 32 decides the transparent display type so as to increase the transmittance of the display object. However, the scope of the present invention is not limited thereto. For example, the setting value can be changed according to any one of the vehicle speed and the acceleration and any one of the steering speed and the steering acceleration.

Further, as one modified example of the previous embodiments, when the vehicle is provided with an obstacle detection sensor (clearance sonar, camera, etc.), the transparent display type can be changed according to the approach distance to an obstacle. With such a configuration, when the existence of the obstacle is recognized based on the detection result of the obstacle detection sensor, the transparency of the display object (e.g., the index line) is increased to enhance the visibility, thereby allowing a driver to recognize the obstacle early. In such a case, it is more preferred to change the transparency only when the obstacle exists in a capturing range of a camera.

Further, the transparent display type can be changed according to the movement speed of an object approaching a vehicle. In general, an object spaced apart from the vehicle is displayed in the peripheral image in a small size. Therefore, a case may occur in which the object may be completely concealed by the display object (e.g., the index line) according to the distance from the vehicle. In this regard, the transparency of the index line is increased according to the movement speed of the object, thereby allowing a driver to recognize the object approaching the vehicle early.

The present invention can be used for a driving assist apparatus that assists driving of a vehicle.

What is claimed is:

1. A driving assist apparatus comprising:
   an image obtaining unit that obtains a rear image of a vehicle, which is captured by an image capturing device provided in the vehicle;
   a display device that is provided in the interior of the vehicle and displays the rear image;
   a display object generation unit that generates, as an index for assisting a driver who drives the vehicle, a plurality of index lines including a backward expected line indicating a rear-end expected locus of the vehicle in accordance with a steering angle of the vehicle which is being reversed, and a vehicle-backward line extending in a front-rear direction of the vehicle from lateral sides of the vehicle;
   a vehicle state detection unit that detects at least one of behavior of the vehicle and a state of a driving operation;
   a display type determining unit that determines a transparent display value of the plurality of index lines based on the detection result of the vehicle state detection unit; and
   a display control unit that superimposes and displays the plurality of index lines on the rear image, which is displayed on the display device, based on the determined transparent display value, wherein
   the display type determining units displays only one of the backward expected line and the vehicle-backward line in a semi-transparent state.

2. The driving assist apparatus according to claim 1, wherein
   the vehicle state detection unit detects at least the behavior of the vehicle,
   the behavior of the vehicle is defined based on the speed or acceleration of the vehicle, and
   when the vehicle speed or the acceleration exceeds a setting value set in advance, the display type determining unit determines the transparent display value so as to increase transmittance of the display object.

3. The driving assist apparatus according to claim 1, wherein
   the vehicle state detection unit detects at least the state of the driving operation,
   the state of the driving operation is defined based on the steering speed or steering acceleration of a steering,
   when the steering speed or the steering acceleration exceeds a setting value set in advance, the display type determining unit determines the transparent display value so as to increase the transmittance of the display object.

4. The driving assist apparatus according to claim 1, wherein the plurality of index lines includes at least one of a side portion and a shadow portion.

5. A driving assist method comprising:
   obtaining a rear image of a vehicle, which is captured by an image capturing device provided in the vehicle;
   displaying the rear image on a display device that is provided in the interior of the vehicle;
   generating, as an index for assisting a driver who drives the vehicle, a plurality of index lines including a backward expected line indicating a rear-end expected locus of the vehicle, in accordance with a steering angle of the vehicle which is being reversed, and a vehicle-backward line extending in a front-rear direction of the vehicle from lateral sides of the vehicle;
   detecting at least one of behavior of the vehicle and a state of a driving operation;
   determining a transparent display value of the plurality of index lines based on the detection result in the detecting step; and
   superimposing and displaying the plurality of index lines on the rear image, which is displayed on the display device, based on the determined transparent display value, wherein
   in the determining step, displaying only one of the backward expected line and the vehicle-backward line in the semi-transparent state.

6. The method according to claim 5, wherein
   in the detecting step, at least the behavior of the vehicle is detected,
   the behavior of the vehicle is defined based on the speed or acceleration of the vehicle, and
   in the determining step, when the vehicle speed or the acceleration exceeds a setting value set in advance, the transparent display value in which transmittance of the display object is increased is determined.

7. The method according to claim 5, wherein
   in the detecting step, at least the state of the driving operation is detected,
   the state of the driving operation is defined based on the steering speed or steering acceleration of a steering, in the determining step, when the steering speed or the steering acceleration exceeds a setting value set in advance, the transparent display value in which the transmittance of the display object is increased is determined.

8. The driving assist method according to claim 5, wherein the plurality of index lines includes at least one of a side portion and a shadow portion.

* * * * *